US011923749B2

(12) United States Patent
Myouki et al.

(10) Patent No.: US 11,923,749 B2
(45) Date of Patent: Mar. 5, 2024

(54) MOTOR DRIVE DEVICE FOR VEHICLES

(71) Applicant: NTN CORPORATION, Osaka (JP)

(72) Inventors: Aiko Myouki, Shizuoka (JP); Tetsuya Yamamoto, Shizuoka (JP); Shinya Taikou, Shizuoka (JP); Shiro Tamura, Shizuoka (JP); Naoya Takeuchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 499 days.

(21) Appl. No.: 17/262,794

(22) PCT Filed: Aug. 9, 2019

(86) PCT No.: PCT/JP2019/031551
§ 371 (c)(1),
(2) Date: Jan. 25, 2021

(87) PCT Pub. No.: WO2020/032229
PCT Pub. Date: Feb. 13, 2020

(65) Prior Publication Data
US 2021/0167659 A1 Jun. 3, 2021

(30) Foreign Application Priority Data
Aug. 9, 2018 (JP) .................. 2018-149989

(51) Int. Cl.
*H02K 5/22* (2006.01)
*H02K 11/00* (2016.01)
*H02K 11/21* (2016.01)
*H02K 7/116* (2006.01)

(52) U.S. Cl.
CPC ............. *H02K 5/225* (2013.01); *H02K 11/21* (2016.01); *H02K 7/116* (2013.01)

(58) Field of Classification Search
CPC ........ H02K 5/225; H02K 11/21; H02K 7/116; H02K 9/19; H02K 11/225; H02K 11/25; B60K 2007/0038; B60K 2007/0061; B60K 7/0007; Y02T 10/64; B60L 2220/50
See application file for complete search history.

(56) References Cited

U.S. PATENT DOCUMENTS

2016/0290347 A1* 10/2016 Kinoshita ............ H01R 13/187

FOREIGN PATENT DOCUMENTS

| JP | 50-042319 | 4/1975 |
|---|---|---|
| JP | 2010-074944 | 4/2010 |
| JP | 2011-240769 | 12/2011 |
| JP | 2012-206709 | 10/2012 |
| JP | 2013-095183 | 5/2013 |

(Continued)

*Primary Examiner* — Thomas Truong
(74) *Attorney, Agent, or Firm* — Clark & Brody LP

(57) ABSTRACT

A casing (10) is divided into a cylindrical first case portion (51) integrally having a partition part (54), a second case portion (52) connected to one end of the first case portion in an axial direction and configured to cover a second space (S2), and a third case portion (53) connected to the other end of the first case portion in the axial direction and configured to cover a first space (S1). A signal cable passed through a through hole (54*c*) of the partition part extends from a sensor (72, 73) to an external connector (81) provided in the second case portion or the third case portion, and is anchored to the first case portion (51) in the vicinity of a through hole (54*c*) of the partition part.

14 Claims, 7 Drawing Sheets

(56) References Cited

FOREIGN PATENT DOCUMENTS

| JP | 2016-068605 | | | 5/2016 |
|---|---|---|---|---|
| JP | 2016-111862 | | | 6/2016 |
| JP | 2018-103977 | | | 7/2018 |
| JP | 2018103977 | A | * | 7/2018 |

* cited by examiner

Outer side in vehicle width direction

Outer side in vehicle width direction
←

Outer side in vehicle width direction

Vehicle anterior

Outer side in vehicle width direction
←

MOTOR DRIVE DEVICE FOR VEHICLES

TECHNICAL FIELD

The present invention relates to a motor drive device for vehicles, and particularly relates to a wiring structure of signal cables in a motor drive device for vehicles.

BACKGROUND ART

Motor drive devices for vehicles include a casing that defines its enclosure, and a motor unit disposed within the casing. Inside the casing are arranged a power line for supplying electric power to the motor unit and a signal cable (signal line) for transmitting detection signals of various sensors to the vehicle body, and these cables are drawn out from the casing to the outside.

Among the motor drive device for vehicles, an in-wheel motor drive device disposed in an inner hollow region (within the wheel) of the wheel is particularly required to be lightweight and compact as much as possible, due to the mountability to the vehicle and in terms of enhancing driving performance. Therefore, in order to dispose the various cables within the limited space without interfering with peripheral components, many thoughts have been given to the protection structure of the cables within the casing and the fixing structure for improving wire connection workability.

Japanese Unexamined Patent Publication No. 2012-206709 (Patent Document 1) discloses a structure that passes a power cable (power line) that supplies electric source to the motor unit through the inside of a motor support shaft. Moreover, as a method for improving workability of wire connection, use of a socket (connector) as in Japanese Unexamined Patent Publication No. 2016-068605 (Patent Document 2) is also broadly implemented.

Japanese Unexamined Patent Publication No. 2016-111862 (Patent Document 3) discloses a wire fixing structure for preventing cables from being pinched in an assembling process of a motor drive device for vehicles.

CITATION LIST

Patent Literatures

[Patent Document 1] Japanese Unexamined Patent Publication No. 2012-206709
[Patent Document 2] Japanese Unexamined Patent Publication No. 2016-068605
[Patent Document 3] Japanese Unexamined Patent Publication No. 2016-111862

SUMMARY OF INVENTION

Technical Problem

In the technique of Patent Document 1, the power line is not positioned and fixed at the point of closing the housing (side portion). Therefore, the wired state of the power line within the housing cannot be directly (visually) confirmed at the time of completing the assembling. For example, a method can be considered in which the wired state of the power line is managed by the length of the wire from a wire inlet of a through hole of a motor shaft, however the tension applied on the cable within the housing and the bent state and clearance from the peripheral components will vary depending on the way the assembly work is performed.

On the other hand, in the technique of Patent Document 3, a signal cable of a revolution sensor attached and fixed to an inner edge surface of a rear cover is arranged in a radial and vertical direction along this inner end surface, and provides a fixing unit on a passage of this signal cable. Furthermore, the technique employs a housing structure that prevents the cable from being pinched at a position that becomes a blind spot when attaching the rear cover to an end portion of the motor casing in an axial direction. Therefore, the technique of Patent Document 3 can eliminate to the utmost degree the possibility of malfunctioning due to the signal cable wired state during assembly and after completion of the drive device.

However, the technique of Patent Document 3 can only be applied to a wiring structure that arranges the signal cable of the sensor attached on the inner end surface of the rear cover in the radial direction, and that draws this signal cable to a terminal box positioned on an outer peripheral side of the motor casing. That is to say, in a motor drive device in which an external connector of the signal cable is provided for example on the rear cover, the technique of Patent Document 3 cannot be applied to the wiring structure of the signal cable from the sensor fixed to the motor casing or the reducer unit casing to the external connector. Therefore, even with such motor drive device, there has been a demand for a technique to improve the reliability of the wired state of the signal cable upon completion of the assembly.

The present invention is accomplished to overcome the above problem, and an object thereof is to provide a motor drive device for vehicles that allows for improving the reliability of a wired state of the signal cable within the casing.

Solution to Problem

A motor drive device for vehicles according to an aspect of this invention includes: a motor unit including a motor rotating shaft configured to drive a wheel; and a casing configured to partition a first space in which the motor unit is disposed and a second space positioned on one side in an axial direction of the first space, and including a partition part provided with a through hole configured to communicate the first and second spaces. The casing is divided into a cylindrical first case portion integrally formed with the partition part, a second case section being connected to one end of the first casing in the axial direction and covering the second space, and a third case portion connected to the other end of the first case portion in the axial direction and covering the first space. This motor drive device for vehicles includes: a sensor disposed within the casing; a signal cable extending from the sensor to an external connector provided in the second case portion or the third case portion and which is passed through the through hole of the partition part; and an anchoring unit. The anchoring unit anchors the signal cable to the first case portion in the vicinity of the through hole of the partition part.

Preferably, the external connector or a cable fixing member provided in the second case portion or the third case portion is disposed at a position facing the through hole of the partition part in the axial direction.

Preferably, the signal cable has a first cable extending from the external connector, and a second cable extending from the sensor side and being connected to the first cable. In this case, the first cable and the second cable are connected by an internal connector, and the anchoring unit preferably includes a connector fixing member that fixes the internal connector in the vicinity of the through hole of the partition part.

Preferably, the external connector is provided in the third case portion. In this case, the external connector or the cable fixing member to a tip of the internal connector preferably has a length in the axial direction not less than a length in the axial direction from the external connector or the cable fixing member to an end plane of the partition part on the second space side.

Preferably, the anchoring unit includes a play retaining member configured to retain a playing part of the first cable or the second cable in the vicinity of the through hole of the partition part.

Preferably, the first cable is connected to the sensor that is fixed to the first case portion.

The signal cable may extend along the axial direction between an internal connector to which the sensor is integrally provided and the external connector. In this case also, the anchoring unit preferably includes a connector fixing member configured to fix the internal connector in the vicinity of the through hole of the partition part.

Preferably, an oil tank configured to store lubricating oil is provided lower of the second space, and the through hole is an opening for returning lubricating oil from the first space to the oil tank in the second space.

The motor drive device for vehicles further includes a reducer unit configured to reduce rotation of the motor rotating shaft, which is positioned in the second space. The reducer unit includes an input shaft coupled with one end of the motor rotating shaft in the axial direction and an output shaft disposed parallel to the input shaft. In this case, the through hole of the partition part is preferably provided at a position below shaft centers of the input shaft and the output shaft of the reducer unit.

The motor drive device for vehicles is preferably an in-wheel motor drive device in which the casing is disposed in an inner hollow region of the wheel. In this case, the one side of the motor rotating shaft in the axial direction is an outer side in a vehicle width direction, and the other side of the motor rotating shaft in the axial direction is an inner side in the vehicle width direction.

Advantageous Effects of Invention

According to the present invention, the wired state of the signal cables within the casing can be directly confirmed in the assembling process of the motor drive device for vehicles. Therefore, according to the present invention, it is possible to improve the reliability of the wired state of the signal cable within the casing.

DESCRIPTION OF EMBODIMENTS

An embodiment of the present invention is described in detail with reference to the drawings. Identical or equivalent portions within the drawings will be provided with identical reference symbols, and their descriptions will not be repeated.

Basic Configuration Example of In-Wheel Drive Device

Figure 1:
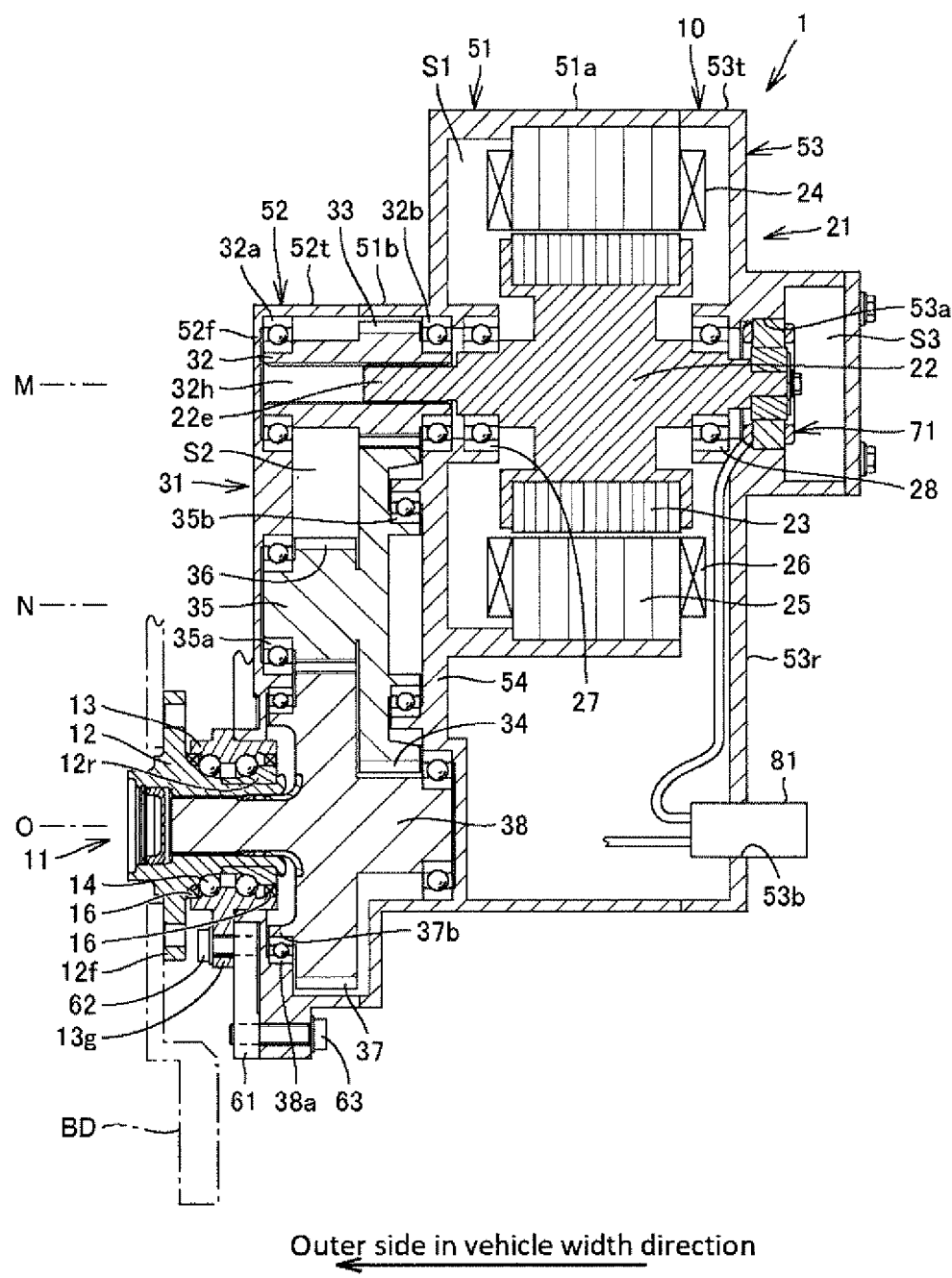
FIG. 1 is a longitudinal section view cutting the in-wheel motor drive device according to an embodiment of the present invention at a predefined plane, and illustrating this in a developed manner.
Figure 2:
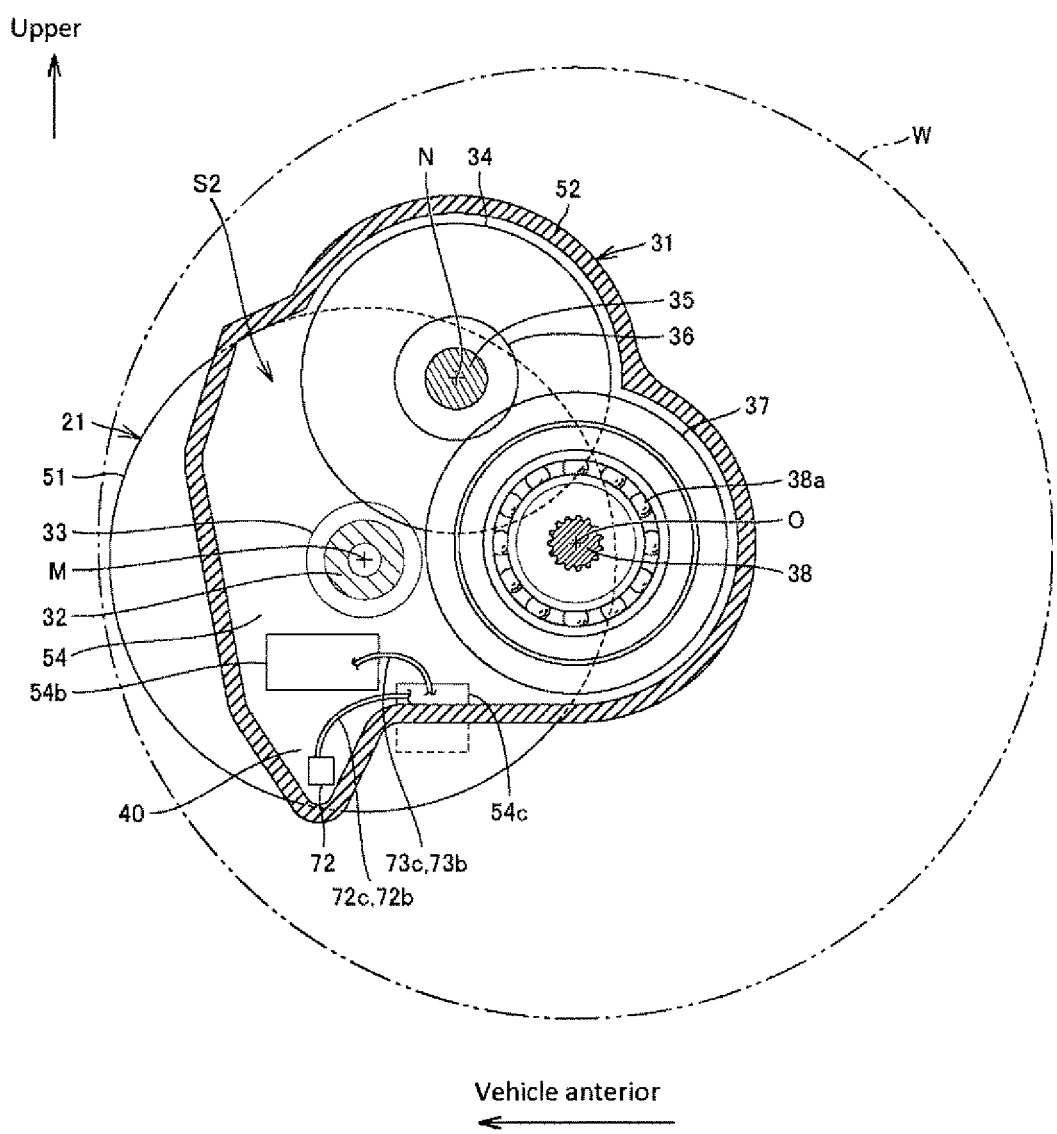
FIG. 2 is a cross sectional view illustrating an inner structure of a reducer unit of the in-wheel motor drive device according to an embodiment of the present invention, and schematically represents a state viewed from an outer side in a vehicle width direction.

First described with reference to FIG. 1 and FIG. 2 is an example of a basic configuration of an in-wheel motor drive device 1 according to an embodiment of the present invention. The in-wheel motor drive device 1 is installed in passenger cars such as electric automobiles and hybrid vehicles.

FIG. 1 is a longitudinal section view cutting the in-wheel motor drive device 1 according to an embodiment of the present invention at a predefined plane, and illustrating this in a developed manner. FIG. 2 is a cross sectional view illustrating an inner structure of a reducer unit 31 of the in-wheel motor drive device 1, and schematically represents a state viewed from an outer side in a vehicle width direction. The predefined plane illustrated in FIG. 1 is a developed plan view connecting a plan view including an axis M and an axis N shown in FIG. 2, and a plan view including the axis N and an axis O, in this order. A left side of printed FIG. 1 represents an outer side (outboard side) in the vehicle width direction, and a right side of printed FIG. 1 represents an inner side (inboard side) in the vehicle width direction. In FIG. 2, each gear within the reducer unit 31 is represented by an addendum circle, and each individual tooth is omitted in the drawing.

The in-wheel motor drive device 1 includes a wheel hub bearing unit 11 provided at the center of a wheel W, a motor unit 21 that drives the wheels, and a reducer unit 31 that reduces the rotation of the motor unit 21 and transmits this to the wheel hub bearing unit 11.

The motor unit 21 and reducer unit 31 are disposed offset of the axis O of the wheel hub bearing unit 11. The axis O extends in the vehicle width direction, and is coaxial to the axle. In the present embodiment, the one side in the axis O direction is the outer side in the vehicle width direction, and the other side in the axis O direction is the inner side in the vehicle width direction.

In regards to positions in the axis O direction, the wheel hub bearing unit 11 is disposed on one side of the in-wheel motor drive device 1 in the axis direction, the motor unit 21 is disposed on the other side of the in-wheel motor drive device 1 in the axis direction, the reducer unit 31 is disposed on the one side in the axis direction of the motor unit 21, and the position in the axis direction of the reducer unit 31 overlaps with the position in the axis direction of the wheel hub bearing unit 11.

The in-wheel motor drive device 1 is a motor drive device for vehicles to drive wheels of an electric motor vehicle. The in-wheel motor drive device 1 is connected to a vehicle body not illustrated. The in-wheel motor drive device 1 can make the electric motor vehicle run at a speed of 0 to 180 km/h.

The in-wheel motor drive device 1 includes a casing 10 that defines its enclosure. In the description of the casing 10, a direction along an axis M direction of the motor unit 21 (axis O direction of the reducer unit 31) is also called an axial direction. Moreover, a direction orthogonal to the axis M direction is called a radial direction.

The casing 10 includes a partition part 54 that partitions in the axial direction a first space S1 in which the motor unit 21 is disposed and a second space S2 in which the reducer unit 31 is disposed. The partition part 54 extends in the radial direction, and has an insertion hole 54a through which one end of the motor rotating shaft 22 in the axis M direction is inserted. The casing 10 is divided into three case portions 51, 52, and 53 along the axial direction.

The first case portion 51 is a cylindrical case portion with the partition part 54 in an integrated manner. The first case portion 51 has a part 51a located on the other side in the axial direction (inner side of the vehicle width direction) of the partition part 54 and a part 51b located on the one side in the axial direction (outer side of the vehicle width direction) of the partition part 54. The partition part 54 is disposed offset to one side in the axial direction from a center position of the first case portion 51 in the axial direction. Therefore, the first case portion 51 mainly functions as a motor casing that surrounds the first space S1. In the following description, among the first case portion 51, the part 51a surrounding the first space S1 side is called body part 51a, and the part 51b surrounding the first space S1 side is called protruding part 51b.

The second case portion 52 is connected to the one end of the first case portion 51 in the axial direction and covers the second space S2. The second case portion 52 includes a cylindrical portion 52t that abuts an end plane of the protruding part 51b of the first case portion 51, and a wall portion 52f of a plate form that closes the one end of the cylindrical portion 52t in the axial direction. As such, the second case portion 52 mainly functions as a reducer unit casing that surrounds the second space S2.

The third case portion 53 is connected to the other end of the first case portion 51 in the axial direction, and covers the first space S1. The third case portion 53 is a lid of the first case portion 51, and functions as a rear cover (motor casing cover). The third case portion 53 is shaped as a bowl for example, and includes a cylindrical portion 53t that abuts an end plane of the body part 51a of the first case portion 51, and a wall portion 53r of a plate shape that closes the other end of the cylindrical portion 53t in the axial direction.

In this case, the motor unit 21 is covered from the one side in the axial direction by the partition part 54, and is covered from the other side in the axial direction by the wall portion 53r. The reducer unit 31 is covered from the one side in the axial direction by the wall portion 52f of the second case portion 52, and is covered from the other side in the axial direction by the partition part 54. The wall portion 52f of the second case portion 52 defines an outer side end plane of the casing 10 in the vehicle width direction, and the wall portion 53r of the third case portion 53 defines an inner side end plane of the casing 10 in the vehicle width direction.

As such, in the present embodiment, the first space S1 including a motor chamber is divided by a cylindrical portion defined by the body part 51a of the first case portion 51 and the cylindrical portion 53t of the third case portion 53, and by the partition part 54 and the wall portion 53r that intersect with this cylindrical portion. The second space S2 including a reducer chamber is divided by a cylindrical portion defined by the cylindrical portion 52t of the second case portion 52 and the protruding part 51b of the first case portion 51, and by the partition part 54 and the wall portion 53f that intersect with this cylindrical portion.

The wheel hub bearing unit 11 is deemed as a rotating inner ring/stationary outer ring, and has an inner ring 12 as a rotating ring (hub ring) that couples with the wheel W, an outer ring 13 as a stationary ring disposed coaxially to an outside diameter side of the inner ring 12, and a plurality of rolling elements 14 disposed in an annular space between the inner ring 12 and the outer ring 13. The center of rotation of the inner ring 12 matches with the axis O passing through the center of the wheel hub bearing unit 11.

The outer ring 13 penetrates through the wall portion 52f of the casing 10 (second case portion 52), and is connected and fixed to this wall portion 52f. For example, a plurality of outer ring protrusions that protrude in an outer radial direction are provided upright at various positions in a circumferential direction on an outer peripheral surface of the outer ring 13, and bolts are passed through from the one side in the axis O direction to the through holes provided to each of the outer ring protrusions. Shank portions of the bolts screw together with a female screw drilled in the wall portion 52f of the casing 10.

The outer ring 13 has a carrier member 61 connected and fixed thereto. On the outer peripheral surface of the outer ring 13, a plurality of outer ring protrusions 13g are provided that protrude in the outer radial direction at various locations in the circumferential direction. The carrier member 61 is positioned on the other side of the outer ring protrusion 13g in the axis O direction, and from the one side in the axis O direction, a bolt 62 is passed through a through hole of the outer ring protrusion 13g and a female screw hole of the carrier member 61. The carrier member 61 is fixed to the outer periphery of the second case portion 52 of the casing 10 by a bolt 63 passed through from the other side in the axis O direction.

The inner ring 12 is of a cylindrical form longer than the outer ring 13, and is passed through a center hole of the outer ring 13. On one end of the inner ring 12 in the axis O direction that protrudes externally (outer side in the vehicle width direction) from the outer ring 13, a coupling portion 12f is formed. The coupling portion 12f is a flange, and configures a coupling unit for coaxially coupling a brake rotor and the wheel. The inner ring 12 couples with the wheel W at the coupling portion 12f, and rotates integrally with the wheel W.

Plural rows of rolling elements 14 are disposed in the annular space between the inner ring 12 and the outer ring 13. The outer peripheral surface of the inner ring 12 at a middle portion in the axis O direction configures an inner race surface of the plurality of rolling elements 14 disposed in a first row. An inner race wheel 12r fits with the outer peripheral surface on the other end of the inner ring 12 in the axis O direction. An outer peripheral surface of the inner race wheel 12r configures an inner race surface of the plurality of the rolling elements 14 disposed in a second row.

The inner peripheral surface of the outer ring 13 on the one end in the axis O direction configures an outer race surface of the rolling elements 14 in the first row. The inner peripheral surface of the outer ring 13 on the other end in the axis O direction configures an outer race surface of the rolling elements 14 in the second row. In the annular space between the inner ring 12 and the outer ring 13, a sealing material 16 also intervenes. The sealing material 16 seals both ends of the annular space, and prevents intrusion of dust and contaminants. In the center hole of the other end of the inner ring 12 in the axis O direction, an output shaft 38 of the reducer unit 31 is inserted and is spline fitted.

The motor unit 21 has a motor rotating shaft 22, a rotor 23, and a stator 24, and these are disposed successively in this order from the axis M of the motor unit 21 radially towards the outside. The stator 24 includes a cylindrical core portion (hereinafter, called "stator core") 25, and a coil 26 wound around the stator core 25. The stator core 25 has steel plates of a ring form stacked in the axis M direction. The motor unit 21 is a radial gap motor with an inner rotor and outer stator form, however this may be of another form. For example, although not illustrated, the motor unit 21 may be an axial gap motor.

Both ends of the motor rotating shaft 22 are rotatably supported to the partition part 54 of the first case portion 51 and the wall portion 53r of the third case portion 52 and via the rolling-element bearings 27, 28. The rolling-element bearing 27 is positioned on the outer side in the vehicle width direction of the rolling-element bearing 28. Accordingly, the one end of the motor rotating shaft 22 in the axis M direction is supported by the rolling-element bearing 27, and the other end of the motor rotating shaft 22 in the axis M direction is supported by the rolling-element bearing 28.

The axis M serving as the center of rotation of the motor rotating shaft 22 and the rotor 23 extends parallel to the axis O of the wheel hub bearing unit 11. Namely, the motor unit 21 is disposed offset, to be away from the axis O of the wheel hub bearing unit 11. For example, as illustrated in FIG. 2, the axis M of the motor unit 21 is disposed offset in a vehicle front-rear direction from the axis O, more specifically on a vehicle front side than the axis O.

The reducer unit 31 has an input shaft 32 that couples coaxially with the motor rotating shaft 22 of the motor unit 21, an input gear 33 provided coaxially with the outer peripheral surface of the input shaft 32, a plurality of intermediate gears 34, 36, an intermediate shaft 35 coupled with the centers of these intermediate gears 34, 36, the output shaft 38 coupled coaxially to the inner ring 12 of the wheel hub bearing unit 11, and an output gear 37 provided coaxially to the outer peripheral surface of the output shaft 38.

The input gear 33 is an external helical gear. The input shaft 32 is of a hollow structure, and one end 22e in the axis direction of the motor rotating shaft 22 is inserted into a hollow portion 32h of the input shaft 32. Accordingly, the motor rotating shaft 22 spline fits (or serration fits) in a relatively non-rotatable manner against the input shaft 32.

The input shaft 32 is supported freely rotatable on both ends of the input gear 33 to the wall portion 52f of the second case portion 52 and the partition part 54 of the first case portion 51, via the rolling-element bearings 32a, 32b. The rolling-element bearing 32a is positioned on the outer side in the vehicle width direction of the rolling-element bearing 32b. Accordingly, the one end of the input shaft 32 in the axis M direction is supported by the rolling-element bearing 32a, and the other end of the input shaft 32 in the axis M direction is supported by the rolling-element bearing 32b.

The axis N serving as the center of rotation for the intermediate shaft 35 of the reducer unit 31 extends parallel to the axis O. Both ends of the intermediate shaft 35 are supported freely rotatable by the wall portion 52f of the second case portion 52 and the partition part 54 of the first case portion 52 via rolling-element bearings 35a, 35b. At the middle portion of the intermediate shaft 35, the first intermediate gear 34 and the second intermediate gear 36 are provided coaxially to the axis N of the intermediate shaft 35. The first intermediate gear 34 and the second intermediate gear 36 are external helical gears, and the diameter of the first intermediate gear 34 is greater than the diameter of the second intermediate gear 36. The first intermediate gear 34 a the larger diameter is disposed on the other side in the axis N direction of the second intermediate gear 36, and meshes with the input gear 33 with a smaller diameter. The second intermediate gear 36 with a smaller diameter is disposed on the one side in the axis N direction of the first intermediate gear 34, and meshes with the output gear 37 with a greater diameter.

The axis N of the intermediate shaft 35 is disposed above the axis O and axis M, as illustrated in FIG. 1. Moreover, the axis N of the intermediate shaft 35 is disposed in the vehicle anterior of the axis O and in the vehicle posterior of the axis M. The reducer unit 31 is a parallel-shaft gear reducer with three shafts disposed spaced out in a vehicle front-rear direction, having respective axes O, N, M extending parallel to each other. In the present embodiment, a cylindrical portion positioned on the outer side in the vehicle width direction (one side in the axial direction) of the partition part 54, namely the cylindrical portion 52t of the second case portion 52, and the protruding part 51b of the first case portion 51 are disposed to surround the axes O, N, M (a plurality of shafts 32, 35, 38).

The output gear 37 is an external helical gear, and is provided coaxially to a middle portion of the output shaft 38. The output shaft 38 extends along the axis O. One end of the output shaft 38 in the axis O direction is inserted into the center hole of the inner ring 12, and is fitted in a relatively non-rotatable manner. Such fitting is spline fitting or serration fitting. The middle portion of the output shaft 38 in the axis O direction (one end side) is supported by the wall portion 52f of the second case portion 52 via the rolling-element bearing 38a. The other end of the output shaft 38 in the axis O direction (other end side) is supported freely rotatable by the partition part 54 of the first case portion 51 via the rolling-element bearing 38b.

The reducer unit 31 reduces the rotation of the input shaft 32 and transmits it to the output shaft 38 by meshing a driving gear of a smaller diameter and a driven gear of a larger diameter, namely meshing the input gear 33 with the first intermediate gear 34, and meshing the second intermediate gear 36 with the output gear 37. Rotating elements from the input shaft 32 to the output shaft 38 of the reducer unit 31 define a drive transmitting path that transmits the rotation of the motor unit 21 to the inner ring 12. The input shaft 32, the intermediate shaft 35, and the output shaft 38 are supported by both ends by the rolling-element bearings described above. These rolling-element bearings 32a, 35a, 38a, 32b, 35b, 38b are radial bearings.

In the present embodiment, as illustrated in FIG. 2, an oil tank 40 is provided lower of the second space S2. The casing 10 protrudes downwards at a position below the input shaft 32, and the oil tank 40 is formed in that protruding part. The oil tank 40 stores lubricating oil. As such, the casing 10 encapsulates lubricating oil, and the lubricating oil circulates within the casing 10.

The lubricating oil lubricates the motor unit 21 and the rotating elements of the reducer unit 31, as well as been used to cool the stator 24 that is a heat generating element of the motor unit 21. The in-wheel motor drive device 1 includes an oil pump (not illustrated) that pumps up the lubricating oil from the oil tank 40, and an oil passage that guides the lubricating oil pumped up by the oil pump to the motor unit 21 and the reducer unit 31.

The oil pump is for example coupled coaxially to the output shaft 38, and is driven by the output shaft 38. More specifically, the other end of the output shaft 38 in the axis O direction extends upon penetrating through the partition part 54, and the oil pump may couple with the other end of the output shaft 38 in the axis O direction that protrudes from this partition part 54.

When electric power is supplied to the stator 24 of the motor unit 21 via a three-phase power cable (not illustrated) from the outside of the in-wheel motor drive device 1, the rotor 23 of the motor unit 21 rotates, and the rotation is outputted from the motor rotating shaft 22 to the reducer unit 31. The reducer unit 31 reduces the rotation inputted from the motor unit 21 to the input shaft 32, and outputs the rotation from the output shaft 38 to the wheel hub bearing unit 11. The inner ring 12 of the wheel hub bearing unit 11 rotates at the same rotational speed as the output shaft 38, and drives the wheel (not illustrated) that is attached and fixed to the inner ring 12.

A power cable is drawn into the first space S1 from a terminal box (not illustrated) provided in the casing 10. The terminal box is, for example, provided upper of the first case portion 51 or the third case portion 53.

Here, a plurality of sensors including a rotary angle sensor (resolver) 28 is disposed within the casing 10, and detected signals of the sensors are transmitted externally (vehicle body side) via signal cables. Therefore, signal cables are arranged for each sensor, within the casing 10.

In the present embodiment, the signal cables are drawn out externally from locations different from the power cables. The signal cables are not drawn externally through the terminal box, but is drawn externally from the wall portion 53*r* of the third case portion 52 of the casing 10. The wiring structure of the signal cables according to the present embodiment is described in details below.

Wiring Structure of Signal Cables

Figure 3:
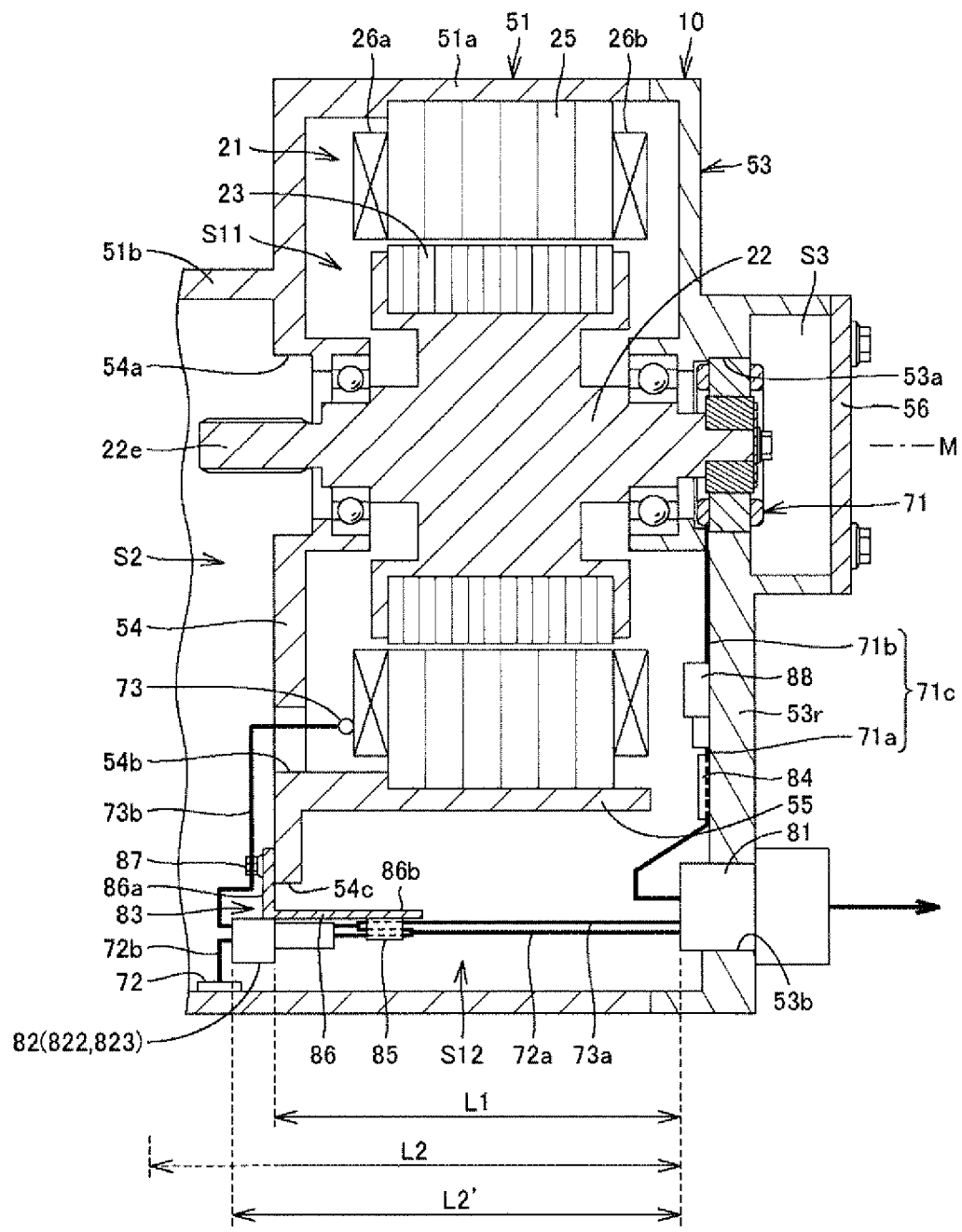
FIG. 3 is a cross sectional view schematically illustrating a wiring structure of a signal cable in an embodiment of the present invention.

Described with reference to FIG. 3 is the wiring structure of the signal cables according to the present embodiment. FIG. 3 is a cross-sectional view schematically illustrating the wiring structure of the signal cables in the present embodiment. In FIG. 3, illustration of the reducer unit 31 has been omitted.

As illustrated in FIG. 3, a signal line outlet 53*b* is provided in the wall portion 53*r* of the third case portion 53. The signal line outlet 53*b* is disposed on an outer side in a radial direction of the position of the outer peripheral surface of the stator 24, when viewing the casing 10 from the inner side in the vehicle width direction along the axis direction. More specifically, the first space S1 has a motor chamber S11 and a wire housing chamber S12 positioned below the motor chamber S11, and the signal line outlet 53*b* is provided at a region facing the wire housing chamber S12 among the wall portion 53*r* of the third case portion 53.

The wire housing chamber S12 is divided in the axial direction by the partition part 54 and the wall portion 53*r*, as with the motor chamber S11. At a boundary position between the motor chamber S11 and the wire housing chamber S12, a boundary wall 55 disposed on the outer periphery of the stator 24 is disposed. The boundary wall 55 extends from the partition part 54 to the inner side in the vehicle width direction.

An external connector 81 is inserted through the signal line outlet 53*b* in the axial direction. Namely, the external connector 81 is fixed to a region facing the wire housing chamber 812 among the wall portion 53*r* of the third case portion 53. The external connector 81 is a connecting member for collecting the plurality of signal cables within the casing 10 and connecting them to external signal cables (not illustrated).

In the present embodiment, a rotary angle sensor 71, an oil temperature thermistor 72, and a motor thermistor 73 are disposed inside the casing 10. The rotary angle sensor 71 is a sensor that detects angle of rotation of the motor rotating shaft 22. The oil temperature thermistor 72 is a sensor that detects the temperature of the lubricating oil circulating within the casing 10. The motor thermistor 73 is a sensor that detects the temperature of the coil 26 of the motor unit 21.

The rotary angle sensor 71 is attached on the other end side of the motor rotating shaft 22 in the axis M direction, and is housed in a sensor chamber S3 provided on the wall portion 53*r* of the third case portion 53. The wall portion 53*r* has a cylindrical opening 53*a* that communicates the motor chamber S11 of the first space S1 with the sensor chamber S3. The rotary angle sensor 71 is disposed in an annular space between the other end of the motor rotating shaft 22 in the axis M direction passed through this opening 53*a* and the cylindrical plane of the opening 53*a*. The sensor chamber S3 is closed by a lid portion 56 connected to the third case portion 53.

A signal cable 71*c* extending from the rotary angle sensor 71 is arranged to the external connector 81 along an inner end plane of the third case portion 53. A wire connection exists in a middle position of the signal cable 71*c*. For example, a cable 71*a* extending from the external connector 81 and a cable 71*b* extending from the rotary angle sensor 71 are connected by an internal connector 88.

The signal cable 71*c* is arranged from the motor chamber S11 to the wire housing chamber S12 by passing through a gap in the axial direction between the wall portion 53*r* of the third case portion 53 and the boundary wall 55 that retains the stator 24. Play of the signal cable 71*c* is retained by a clamp member 84, and is fixed to the wall portion 53*r* of the third case portion 53. The clamp member 84 is a play retaining member that retains the play of the signal cable 71*c*. This allows for preventing the signal cable 71*c* from interfering with the motor unit 21.

As such, since the rotary angle sensor 71 is fixed to the third case portion 53 provided with the external connector 81, the wire connection of the signal cable 71*c* of the rotary angle sensor 71 and the connection to the external connector 81 concludes within the third case portion 53.

On the other hand, the oil temperature thermistor 72 and the motor thermistor 73 are disposed independently of the third case portion 53, different from the rotary angle sensor 71. More specifically, the oil temperature thermistor 72 is, for example, disposed within the oil tank 40 in the second space S2 as illustrated in FIG. 2. The motor thermistor 73 is, for example, provided to a coil (coil end) 26*a* positioned on one side in the axis M direction of the stator core 25, as illustrated in FIG. 3.

Therefore, the signal cable 72*c* of the oil temperature thermistor 72 is drawn into the wire housing chamber S12 of the first space S1 through the through hole 54*c* of the partition part 54. The signal cable 72*c* has the cable 72*b* extending from the oil temperature thermistor 72 and the cable 72a extending from the external connector 81 side, and these cables 72a, 72b are connected in the vicinity of the through hole 54c. FIG. 2 schematically illustrates a state in which the cable 72a whose one end is connected to the oil temperature thermistor 72 is arranged to the through hole 54c.

The partition part 54 has, in addition to the insertion hole 54a described above, two through holes 54b, 54c. The signal cable 73c of the motor thermistor 73, after being drawn out to the second space S2 side once passed through one of the through holes, 54b, is drawn into the other through hole 54c to the wire housing chamber S12. As illustrated in FIGS. 2 and 3, the through hole 54c is positioned relatively outer in the radial direction and below the through hole 54b.

That is to say, the signal cable 73c of the motor thermistor 73 disposed in the motor chamber S11 of the first space S1 is drawn into the wire housing chamber S12 via the through holes 54b, 54c and detouring to the second space S2 (reducer chamber) side. The through holes 54b, 54c provided in the partition part 54 are oil return paths (opening) to return the lubricating oil from the motor chamber S11 in the first space S1 to the oil tank 40 in the second space S2. In the present embodiment, two through holes 54b, 54c are provided as the oil return paths, however the oil return path may be accomplished as one through hole.

The signal cable 73c includes the cable 73b extending from the motor thermistor 73 and the cable 73a extending from the external connector 81 side, and these cables 73a, 73b are also connected in the vicinity of the through hole 54c. FIG. 2 schematically illustrates a state in which the cable 73c whose one end is connected to the motor thermistor 73 is arranged to the through hole 54c via the through hole 54b.

The external connector 81 is disposed at a position facing the through hole 54c in the axial direction, through which the signal cables 72c, 73c are passed. Therefore, it is possible to arrange the two connector side cables 72a, 73a whose one end is connected to the external connector 81, linearly along the axial direction.

Figure 4:
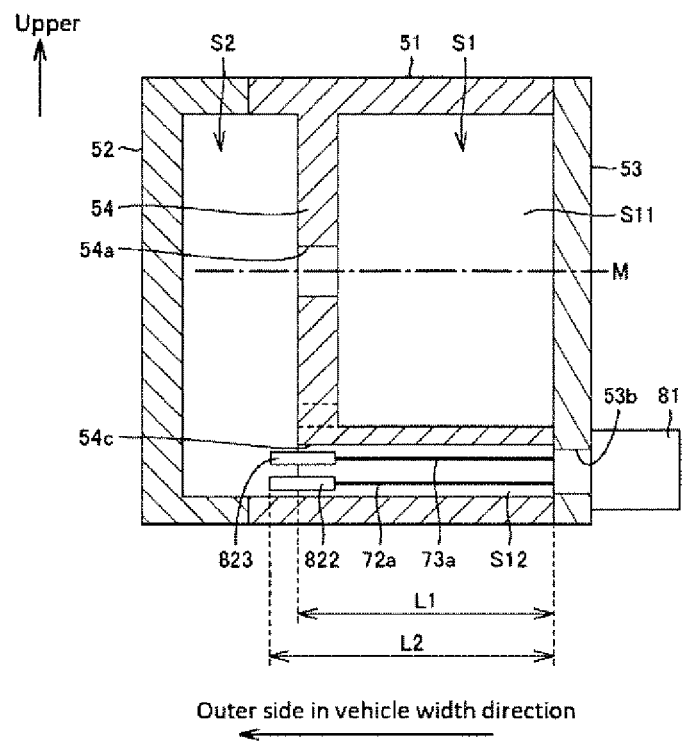
FIG. 4 is a view conceptually illustrating a positional relationship in an axial direction of a partition part and an internal connector, in an embodiment of the present invention.

In the present embodiment, the sensor side cable 72b whose one end is connected to the oil temperature thermistor 72 and the connector side cable 72a whose one end is connected to the external connector 81 are connected by the internal connector 82 (internal connector 822 illustrated in FIG. 4). Similarly, the sensor side cable 73b whose one end is connected to the motor thermistor 73 and the connector side cable 73a whose one end is connected to the external connector 81 are connected by the internal connector 82 (internal connector 823 illustrated in FIG. 4).

As such, the connector side cables 72a, 73a (first cable) and the sensor side cables 72b, 73b (second cable) are connected by the internal connector 82. The internal connector 82 is fixed to tips of the connector side cables 72a, 73a, and at tip portions of the sensor side cables 72b, 73b, a terminal portion (not illustrated) that engages with the internal connector 82 is provided.

Rough assembly procedures of the in-wheel motor drive device 1 is as follows.
Process P1: Assemble the motor unit 21 on the first space S1 side of the first case portion 51.
Process P2: Close the inner side plane of the first case portion 51 in the vehicle width direction with the third case portion 53 to which the external connector 81 and the rotary angle sensor 71 are fixed in advance.
Process P3: Connect the sensor side cables 72b, 73b of the oil temperature thermistor 72 and the motor thermistor 73 and their connector side cables 72a, 73a, with the internal connector 82.
Process P4: Assemble the reducer unit 31 on the second space S2 side of the first case portion 51.
Process P5: Close the outer side plane of the first case portion 51 in the vehicle width direction with the second case portion 52, to complete the casing 10. Moreover, fix the wheel hub bearing unit 11 to the wall portion 52f of the second case portion 52.

As such, in the present embodiment, the wire connection work of the signal cables 72c, 73c of the oil temperature thermistor 72 and the motor thermistor 73 is performed after connecting the first case portion 51 and the third case portion 53.

Here, referring to the conceptual drawing of FIG. 4, a length in the axial direction from the external connector 81 attached to the third case portion 53 (or the inner end plane of the third case portion 53) to the position of the through hole 54c on the outer end plane of the partition part 54 in the vehicle width direction is represented by length L1. Moreover, a length in the axial direction from the external connector 81 attached to the third case portion 53 (or the inner end plane of the third case portion 53) to the tip position of the internal connector 82 is represented by length L2.

Under this condition, the length L2 in the axial direction from the external connector 81 to the internal connector 82 is not less than the length L1 in the axial direction from the external connector 81 to the partition part 54. Accordingly, it is possible to expose the tip of the internal connector 82 to the second space S2 side when coupling the third case portion 53 to the first case portion 51 in process P2. It is thus possible to easily perform the connecting work of the sensor side cables 72b, 73b to the internal connector 82 in the second space S2 side.

Moreover, in the present embodiment, in process P3, after the signal cables 72c, 73c are connected, the internal connector 82 is anchored in the vicinity of the through hole 54c of the partition part 54. Namely, the in-wheel motor drive device 1 includes an anchoring unit 83 to anchor the signal cables 72c, 73c to the first case portion 51 in the vicinity of the through hole 54c of the partition part 54.

The anchoring unit 83 includes, for example, a retaining member 86 that retains the internal connector 82, and a bolt 87 for fixing the retaining member 86 to the partition part 54. The retaining member 86 and the bolt 87 constitute a connector fixing member for fixing the internal connector 82 in the vicinity of the through hole 54c of the partition part 54.

The retaining member 86 is formed in an L-shape for example, and has a first plate portion 86a fixed by the bolt 87 to an end plane of the partition part 54 on the second space S2 side and extending in the radial direction, and a second plate portion 86b that intersects orthogonally to the first plate portion 86a and extends within the wire housing chamber S12 towards the other side in the axial direction (inner side in the vehicle width direction). The internal connector 82 is retained by the second plate portion 86b.

Figure 5:
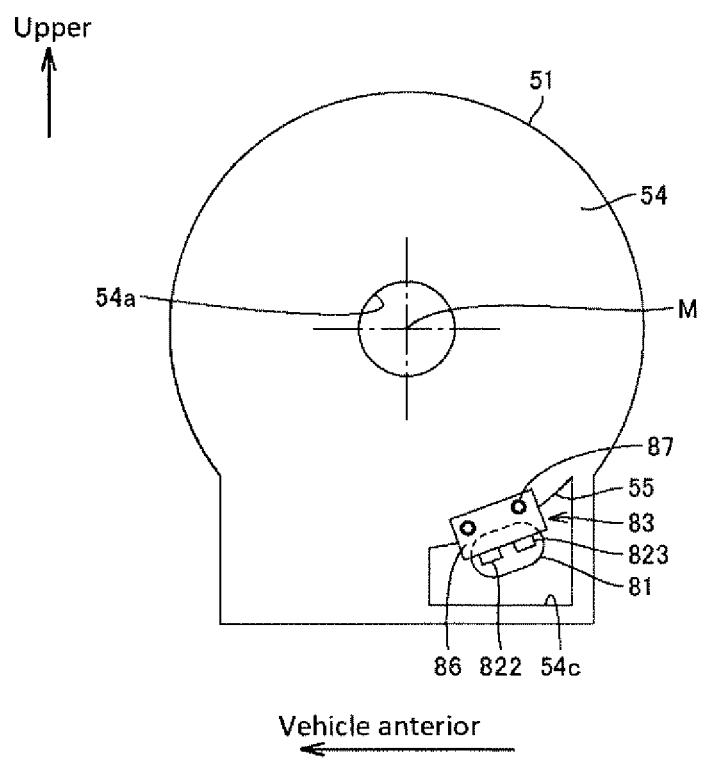
FIG. 5 is a view conceptually illustrating an anchored state of the internal connector, viewing the first case portion from the outer side in the vehicle width direction, in an embodiment of the present invention.

FIG. 5 conceptually illustrates a state in which the internal connector 82 (822, 823) is anchored by the partition part 54. FIG. 5 is a view looking at the first case portion 51 from the outer side in the vehicle width direction. The second plate portion 86b of the retaining member 86 has, for example, an engaged portion (not illustrated) to which an engaging portion provided in the internal connector 82 is engaged.

The internal connector 82 may be fixed to the boundary wall 55 extending from the partition part 54 towards the inner side in the vehicle width direction.

As described above, the external connector 81 (signal line outlet 52b) is disposed at a position facing the through hole 54c of the partition part 54 in the axial direction. More specifically, as illustrated in the conceptual diagram of FIG. 4, in a case of viewing the partition part 54 from the outer side in the vehicle width direction, the through hole 54c and at least one part of the external connector 81 overlaps. This allows for visually confirming the state inside the wire housing chamber S12, and hence allows for confirming the wired state of the signal cables 72c, 73c within the wire housing portion S12.

Namely, after completion of the wire connection work of the signal cables 72c, 73c in process P3, it is possible to visually confirm the final wired state of the signal cables 72c, 73c within the wire housing chamber S12 before assembling the reducer unit 31 in process P4. That is to say, in the process of assembling the in-wheel motor drive device 1, it is possible to confirm the wired state of the signal cables 72c, 73c after assembly completion.

In the wire housing chamber S12, the signal cables 72c, 73c (connector side cables 72a, 73a) are preferably arranged linearly along the axial direction. Therefore, in a case in which there is play more than necessary in the connector side cables 72a, 73a, it is preferable to anchor the playing part in the vicinity of the through hole 54c of the partition part 54. In the present embodiment, as illustrated in FIG. 3, the anchoring unit 83 includes a clamp member 85 for retaining the playing part of the connector side cables 72a, 73a in the vicinity of the through hole 54c of the partition part 54. The clamp member 85 is fixed to the second plate portion 86b of the retaining member 86 together with the internal connector 82.

Similarly for the sensor side cables 72b, 73b, in the case in which there is play more than necessary, the anchoring unit 83 preferably includes a play retaining member (clamp member) that retains the playing part of the sensor side cables 72b, 73b in the vicinity of the through hole 54c of the partition part 5.

This thus allows for holding down unexpected movements of the signal cables 72c, 73c, thereby preventing disconnection of the signal cables 72c, 73c.

As described above, according to the present embodiment, since the second case portion 52 is connected to the first case portion 51 after the fixing (anchoring) of the signal cables 72c, 73c has completed, it is possible to improve the reliability of the wired state of the signal cables 72c, 73c within the casing 10. Therefore, it is possible to prevent defects such as disconnection of the signal cables 72c, 73c.

Moreover, since the fixed position of the signal cables 72c, 73c does not extend over a plurality of case portions, it is easy to perform the wire connection work, and can minimize the play of the signal cables 72c, 73c.

Moreover, since the external connector 81 is fixed to the third case portion 53, a wiring length from the external connector 81 to an inverter (not illustrated) installed on the vehicle body side may be minimized.

Moreover, since the external connector 81 is fixed to the third case portion 53 at a position facing the through hole 54e of the partition part 54, it is possible to wire the cables 72a, 73a extending from the external connector 81 linearly towards the through hole 54c. Therefore, it is possible to prevent any interference with peripheral components within the first space S1 and the casing 10.

Moreover, by having the length L2 in the axial direction from the external connector 81 to the tip of the internal connector 82 be not less than the length L1 in the axial direction from the external connector 81 to the partition part 54 in the state prior to performing the wire connection work of the signal cables 72c, 73c, the internal connector 82 can be drawn out to the second space S2 side in the assembly process. This thus facilitates the wire connection work.

FIG. 3 illustrates that the length L2 in the axial direction prior to the play of the connector side cables 72a, 73a being anchored is longer than a length L2' upon anchoring. The length L2 in the case of not providing the internal connector 82 may be interpreted as the length in the axial direction from the external connector 81 to the tip positions of the cables 72a, 73a.

Modification 1

Figure 6:
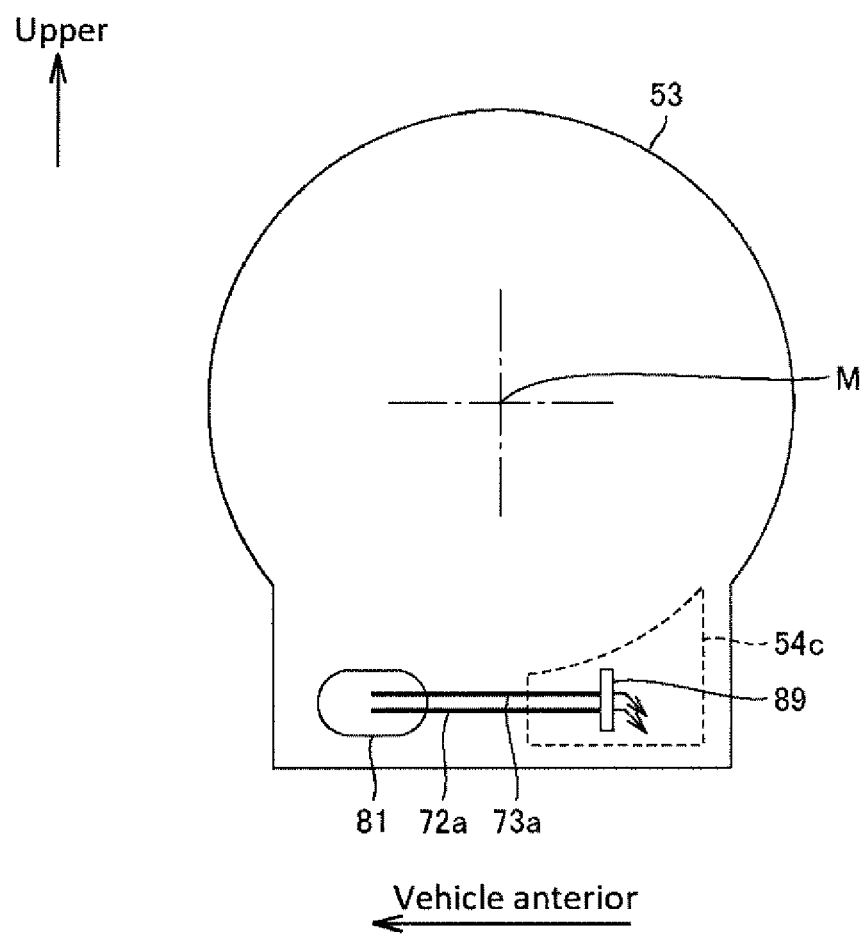
FIG. 6 is a view conceptually illustrating a position of the external connector, viewing the third case portion from an outer side in the vehicle width direction, in Modification 1 of an embodiment of the present invention.

In the present embodiment, the external connector 81 is to be disposed at a position facing the through hole 54c of the partition part 54 in the axial direction, however it is not limited to this. As illustrated in the conceptual diagram of FIG. 6, a cable fixing member 89 that fixes the connector side cables 72a, 73a to the third case portion 53 may be disposed at the position facing the through hole 54c in the axial direction. In this example also, it is possible to arrange the connector side cables 72a, 73a linearly along the axial direction within the wire housing chamber S12.

Modification 2

Figure 7:
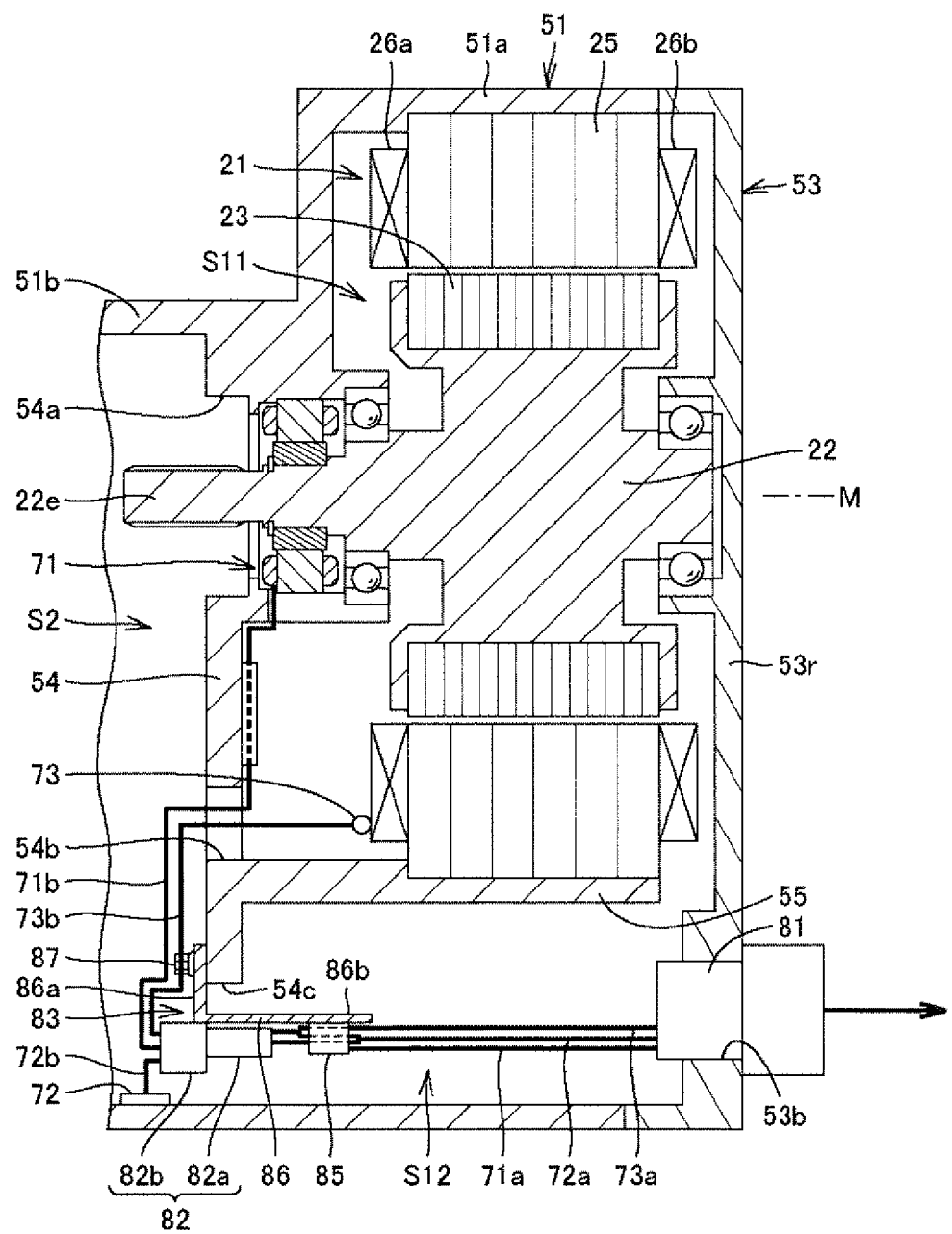
FIG. 7 is a view schematically illustrating another arrangement example of a rotary angle sensor.

In the present embodiment, the rotary angle sensor 71 is to be disposed on the other end side of the motor rotating shaft 22 in the axis M direction, however it is not limited to this. As illustrated in the schematic diagram of FIG. 7, the rotary angle sensor 71 may be disposed on the one end side of the motor rotating shaft 22 in the axis M direction. Namely, the rotary angle sensor 71 may be provided in the insertion hole 54a of the partition part 54.

In this case, the signal cable 71c of the rotary angle sensor 71 may be arranged in the wire housing chamber S1 upon passing through the through holes 54b, 54c of the partition part 54, as with the motor thermistor 73. The sensor side cable 71b and the connector side cable 71a of the rotary angle sensor 71 are connected by the internal connector 82 anchored in the vicinity of the through hole 54c.

Other Modifications

In the present embodiment, the internal connector 82 is to be anchored by the bolt 87 via the retaining member 86, however it is not limited to this. For example, the internal connector 82 may be anchored to the partition part 54 by a cable tie, a clip, a hose band or the like.

Moreover, in the present embodiment, the through hole 54c that passes through the signal cables 72c, 73c was to be the oil return path, however it is not limited to this. The through hole 54c provided in the partition part 54 may be, for example, a hole for inner pressure adjustment between the first space S1 (motor chamber S11) and the second space S2 (reducer chamber), or alternatively a lightening hole for weight reduction or rigidity adjustment. The through hole 54c that passes through the signal cables 72c, 73c is preferably provided below the shaft center of the input shaft 32 and the output shaft 38 of the reducer unit 31, however the position of the through hole 54c is not particularly limited.

Regardless of the position of the through hole 54c, the play of the internal connector 82 and the signal cables 72c, 73c is not to interfere with the rotor 23 and the stator 24 of the motor unit 21, and is to be anchored in a range in which it does not interfere with the rotating elements (gear, bearing etc.) of the reducer unit 31. Moreover, the play of the signal cables 72c, 73c is anchored in a range not pinched between facing planes of the first case portion 51 and the second case portion 52 or the third case portion 53. In a case in which the play of the signal cables 72c, 73c is very small, and no contact may occur on to the rotating elements, heat generating elements, and facing surfaces, the signal cables 72c, 73c do not need to be clamped.

Moreover, a plurality of sensors disposed within the casing 10 is to include the rotary angle sensor 71, oil temperature thermistor 72, and the motor thermistor 73, however other types of sensors may be included. In the case in which the external connector 81 is provided to the third case portion 53 as in the present embodiment, the plurality of sensors disposed within the casing 10 is preferably fixed to components other than the second case portion 52 (first case portion 51 or third case portion 53).

Moreover, the wiring structure described above may be applied to the wiring structure of the sensor disposed outside the casing 10. Such sensors include a wheel speed sensor (not illustrated). A wheel speed sensor is a rotary sensor typically used in ABS (anti-lock brake system). In this case, the wheel speed sensor is fixed to the outer peripheral portion of the first case portion 51, and a sensor side cable of the wheel speed sensor is drawn into the first space S1 or the second space S2 from an inlet provided in the outer peripheral portion of the first case portion 51. The inlet is provided with a sealing member.

Regardless of the type and the number of sensors disposed within the casing 10, the signal cable passing through the through hole 54c of the partition part 54 may be one.

Moreover, in the present embodiment, the connector side cables 72a, 73a and the sensor side cables 72b, 73b are to be connected in the vicinity of the through hole 54c of the partition part 54, however it is not limited to this. For example, as illustrated in the conceptual diagram of FIG. 8, the connected position of the signal cables 72c, 73c may be a position on the inner side in the vehicle width direction of the first case portion 51. Namely, the internal connector 82 may be provided at a position close to the external connector 81.

Figure 8:
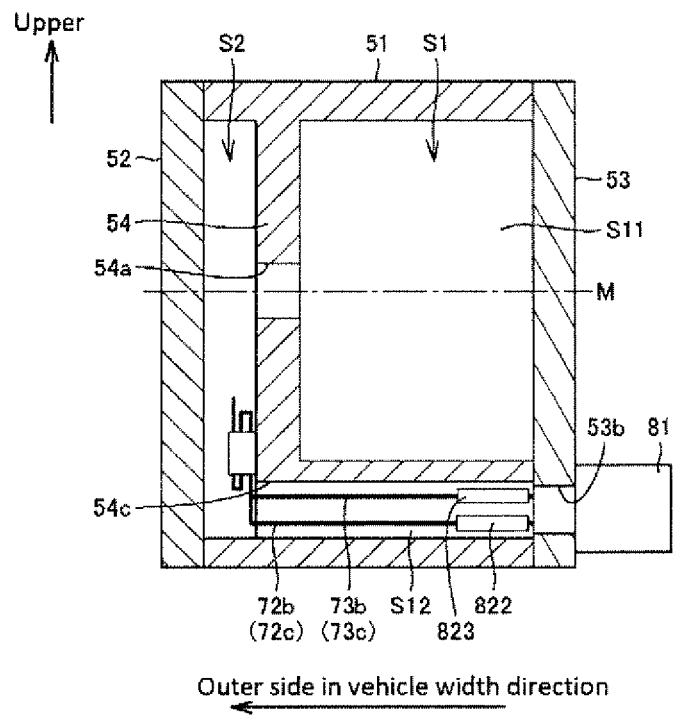
FIG. 8 is a view schematically illustrating another example of a connected position of the signal cable.

In this case, the assembly processes P2 and P3 of the in-wheel motor drive device interchanges. Namely, after the wire connection work is performed for the signal cables 72c, 73c, the inner end plane of the first case portion 51 in the vehicle width direction is closed with the third case portion 53. FIG. 8 illustrates a state in which the playing part of the sensor side cables 72b, 73b is anchored in the vicinity of the through hole 54c in the outer end plane of the partition part 54 in the vehicle width direction.

Figure 9:
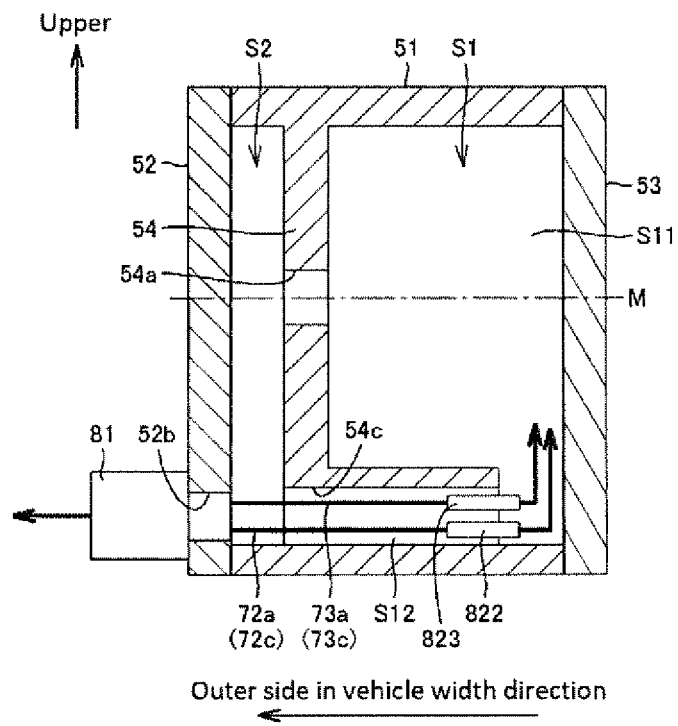
FIG. 9 is a view schematically illustrating another arrangement example of the external connector.

Alternatively, in the present embodiment, the external connector 81 is to be fixed to the third case portion 53, however this may be fixed to the second case portion 52. Namely, a signal line outlet 52b may be provided in the second case portion 52. In this case, as illustrated in the conceptual diagram of FIG. 9, the internal connector 82 may be anchored at a position on the inner side of the partition part 54 in the vehicle width direction.

The length in the axial direction of the sensor side cable between the sensor and the internal connector 82 may be 0. Namely, the sensor (for example the oil temperature thermistor 72) may be provided integrally with the internal connector 82. In this case, at least one of the plurality of signal cables passed through the through hole 54c can have no sensor side cable. That is to say, a signal cable configured of a connector side cable may extend along the axial direction between the internal connector 82 to which the sensor is integrally provided and the external connector 81.

In the embodiment described above, the reducer unit 31 is described as a four-shaft parallel-shaft type gear reducer, however this may be a three-shaft parallel-shaft type gear reducer. Alternatively, as long as it is a reducer mechanism with its final stage based on a parallel-shaft type gear, the reducer unit 31 may be a reducer combining a parallel-shaft type gear and a planetary gear. Moreover, the wheel hub bearing unit 11 is described as an inner ring rotating type, however this may be an outer ring rotating type.

Alternatively, the in-wheel motor drive device 1 is described as including the reducer unit 31, however the in-wheel motor drive device 1 can include no reducer unit 31. In this case, the second case portion 52 may be a simple lid that closes the through hole 54c of the partition part 54 of the first case portion 51.

Alternatively, the present embodiment is described using an example of a motor drive device for vehicles whose casing 10 is disposed in the inner hollow region of the wheel, that is to say the in-wheel motor drive device, however it is not limited to this. That is to say, the wiring structure of the signal cable of the present embodiment may be applied to a motor drive device for vehicles including a casing that is divided into a cylindrical first case portion integrally formed with the partition part, a second case portion connected to one end of the first case portion in the axial direction and covering the second space, and a third case portion connected to the other end of the first case portion in the axial direction and covering the first space.

The embodiments disclosed in the present specification is only exemplary in all aspects, and should be considered not limitative. The scope of the present invention is shown not by the above descriptions but by the claims, and is intended to include meanings equivalent to the scope of the claims and all modifications within the scope.

REFERENCE SIGNS LIST

1 In-wheel motor drive device
10 Casing
11 Wheel hub bearing unit
21 Motor unit
22 Motor rotating shaft
24 Stator
26 Coil
31 Reducer unit
32 Input shaft
35 Intermediate shaft
38 Output shaft
40 Oil tank
51 First case portion
52 Second case portion
53 Third case portion
54 Partition part
54b, 54c Through hole
71 Rotary angle sensor
72 Oil temperature thermistor
73 Motor thermistor
71c, 72c, 73c Signal cable
71a, 72a, 73a Connector side cable
71b, 72b, 73b Sensor side cable
81 External connector 82, 88, 822, 823 Internal connector
83 Anchoring unit
84, 85 Clamp member
86 Retaining member
89 Cable fixing member
S1 First space
S2 Second space
S3 Sensor chamber
S11 Motor chamber
S12 Wire housing chamber
W Wheel

The invention claimed is:

1. A motor drive device for vehicles, comprising:
a motor unit including a motor rotating shaft configured to drive a wheel; and a casing including a partition part configured to partition a first space in which the motor unit is disposed and a second space positioned on one side in an axial direction of the first space, the partition part provided with a through hole configured to communicate the first and second spaces,
wherein the casing is divided into a cylindrical first case portion integrally formed with the partition part, a second case portion being connected to one end of the first case portion in the axial direction and configured to cover the second space, and a third case portion connected to the other end of the first case portion in the axial direction and configured to cover the first space, the motor drive device for vehicles further comprising:
a sensor disposed within the casing;
a signal cable extending from the sensor to an external connector provided in the second case portion or the third case portion and passed through the through hole of the partition part; and
an anchoring unit configured to anchor the signal cable to the first case portion in the vicinity of the through hole of the partition part;
wherein the signal cable has a first cable extending from the external connector, and a second cable extending from the sensor side and being connected to the first cable,
wherein the first cable and the second cable are connected by an internal connector, and
the anchoring unit includes a connector fixing member configured to fix the internal connector in the vicinity of the through hole of the partition part.

2. The motor drive device for vehicles according to claim 1, wherein the external connector or a cable fixing member provided in the second case portion or the third case portion is disposed at a position facing the through hole of the partition part in the axial direction.

3. The motor drive device for vehicles according to claim 2, wherein
the external connector is provided in the third case portion, and
the external connector or the cable fixing member to a tip of the internal connector has a length in the axial direction not less than a length in the axial direction from the external connector or the cable fixing member to an end plane of the partition part on the second space side.

4. The motor drive device for vehicles according to claim 1, wherein the anchoring unit includes a play retaining member configured to retain a playing part of the first cable or the second cable in the vicinity of the through hole of the partition part.

5. The motor drive device for vehicles according to claim 1, wherein an oil tank configured to store lubricating oil is provided lower of the second space, and
the through hole is an opening for returning lubricating oil from the first space to the oil tank in the second space.

6. The motor drive device for vehicles according to claim 1, further comprising a reducer unit configured to reduce rotation of the motor rotating shaft, which is positioned in the second space, the reducer unit including an input shaft coupled with one end of the motor rotating shaft in the axial direction and an output shaft disposed parallel to the input shaft, and
the through hole of the partition part is provided at a position below shaft centers of the input shaft and the output shaft of the reducer unit.

7. The motor drive device for vehicles according to claim 1, wherein the casing is disposed inside an inner hollow region of the wheel, and
wherein one side of the motor rotating shaft in the axial direction is an outer side in a vehicle width direction, and the other side of the motor rotating shaft in the axial direction is an inner side in the vehicle width direction.

8. A motor drive device for vehicles, comprising:
a motor unit including a motor rotating shaft configured to drive a wheel; and a casing including a partition part configured to partition a first space in which the motor unit is disposed and a second space positioned on one side in an axial direction of the first space, the partition part provided with a through hole configured to communicate the first and second spaces,
wherein the casing is divided into a cylindrical first case portion integrally formed with the partition part, a second case portion being connected to one end of the first case portion in the axial direction and configured to cover the second space, and a third case portion connected to the other end of the first case portion in the axial direction and configured to cover the first space, the motor drive device for vehicles further comprising:
a sensor disposed within the casing;
a signal cable extending from the sensor to an external connector provided in the second case portion or the third case portion and passed through the through hole of the partition part; and
an anchoring unit configured to anchor the signal cable to the first case portion in the vicinity of the through hole of the partition part;
wherein the signal cable extends in the axial direction between an internal connector in which the sensor is integrally provided and the external connector, and
the anchoring unit includes a connector fixing member configured to fix the internal connector in the vicinity of the through hole of the partition part.

9. The motor drive device for vehicles according to claim 8, wherein the external connector or a cable fixing member provided in the second case portion or the third case portion is disposed at a position facing the through hole of the partition part in the axial direction.

10. The motor drive device for vehicles according to claim 9, wherein
the external connector is provided in the third case portion, and
the external connector or the cable fixing member to a tip of the internal connector has a length in the axial direction not less than a length in the axial direction from the external connector or the cable fixing member to an end plane of the partition part on the second space side.

11. The motor drive device for vehicles according to claim 8, wherein the anchoring unit includes a play retaining member configured to retain a playing part of the first cable or the second cable in the vicinity of the through hole of the partition part.

12. The motor drive device for vehicles according to claim 8, wherein an oil tank configured to store lubricating oil is provided lower of the second space, and
the through hole is an opening for returning lubricating oil from the first space to the oil tank in the second space.

13. The motor drive device for vehicles according to claim 8, further comprising a reducer unit configured to reduce rotation of the motor rotating shaft, which is positioned in the second space, the reducer unit including an input shaft coupled with one end of the motor rotating shaft in the axial direction and an output shaft disposed parallel to the input shaft, and
the through hole of the partition part is provided at a position below shaft centers of the input shaft and the output shaft of the reducer unit.

14. The motor drive device for vehicles according to claim 8, wherein the casing is disposed inside an inner hollow region of the wheel, and
wherein one side of the motor rotating shaft in the axial direction is an outer side in a vehicle width direction, and the other side of the motor rotating shaft in the axial direction is an inner side in the vehicle width direction.

\* \* \* \* \*